United States Patent
Shaw et al.

(10) Patent No.: US 11,354,549 B2
(45) Date of Patent: Jun. 7, 2022

(54) METHOD AND SYSTEM FOR REGION PROPOSAL BASED OBJECT RECOGNITION FOR ESTIMATING PLANOGRAM COMPLIANCE

(71) Applicant: Tata Consultancy Services Limited, Mumbai (IN)

(72) Inventors: Avishek Kumar Shaw, Kolkata (IN); Rajashree Ramakrishnan, Chennai (IN); Shilpa Yadukumar Rao, Chennai (IN); Pranoy Hari, Chennai (IN); Dipti Prasad Mukherjee, Kolkata (IN); Bikash Santra, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 223 days.

(21) Appl. No.: 16/928,682

(22) Filed: Jul. 14, 2020

(65) Prior Publication Data
US 2021/0042588 A1 Feb. 11, 2021

(30) Foreign Application Priority Data

Jul. 16, 2019 (IN) .............................. 201921028670

(51) Int. Cl.
*G06K 9/62* (2022.01)
*G06N 20/20* (2019.01)
(Continued)

(52) U.S. Cl.
CPC ......... *G06K 9/6282* (2013.01); *G06K 9/6218* (2013.01); *G06K 9/6256* (2013.01);
(Continued)

(58) Field of Classification Search
CPC .. G06K 9/6282; G06K 9/6218; G06K 9/6256; G06K 9/6271; G06K 9/6215;
(Continued)

(56) References Cited

U.S. PATENT DOCUMENTS 8,189,855 B2 5/2012 Opalach et al.
9,767,430 B2 9/2017 Schwartz
(Continued)

OTHER PUBLICATIONS

Xinlei Chen, et al., "An Implementation of Faster RCNN with Study for Region Sampling," Computer Vision and Pattern Recognition (cs.CV), Feb. 2017, Arxiv.org, https://arxiv.org/abs/1702.02138.
(Continued)

*Primary Examiner* — Charlotte M Baker
(74) *Attorney, Agent, or Firm* — Finnegan, Henderson, Farabow, Garrett & Dunner, LLP

(57) ABSTRACT

This disclosure relates generally to a system and method to identify various products on a plurality of images of various shelves of a retail store to facilitate compliance with respect to planograms. Planogram is a visual plan, which designates the placement of products on shelves and merchandising display fixtures of a retail store. Planograms are used to create consistency between store locations, to provide proper shelf space allocation, to improve visual merchandising appeal, and to create product-pairing suggestions. There are a few assumptions considering one instance per product class is available beforehand and the physical dimension of each product template is available in some suitable unit of length. In case of absence of physical dimension of the products, a context information of the retail store will be used. The context information is that the products of similar shapes or classes are arranged together in the shelves for consumers' convenience.

15 Claims, 6 Drawing Sheets

(51) Int. Cl.
  *G06N 3/04* (2006.01)
  *G06N 3/08* (2006.01)
  *G06Q 10/08* (2012.01)
  *G06T 7/60* (2017.01)
  *G06V 10/75* (2022.01)
  *G06N 5/00* (2006.01)

(52) U.S. Cl.
  CPC .............. *G06N 3/04* (2013.01); *G06N 3/08* (2013.01); *G06N 20/20* (2019.01); *G06Q 10/087* (2013.01); *G06T 7/60* (2013.01); *G06V 10/751* (2022.01); *G06N 5/003* (2013.01)

(58) Field of Classification Search
  CPC ............ G06N 3/04; G06N 3/08; G06N 20/20; G06N 5/003; G06N 7/005; G06Q 10/087; G06T 7/60; G06T 2207/20081; G06T 7/0008; G06T 2207/20084; G06V 10/751; G06V 10/759; G06V 10/757; G06V 10/82; G06V 20/52; G06V 10/462

USPC ........................................................ 382/157
See application file for complete search history.

(56) References Cited

U.S. PATENT DOCUMENTS

| | | |
|---|---|---|
| 10,133,933 B1 | 11/2018 | Fisher et al. |
| 10,223,610 B1 | 3/2019 | Akselrod-Ballin et al. |
| 10,573,134 B1* | 2/2020 | Zalewski ............. G07G 1/0072 |
| 2018/0005079 A1* | 1/2018 | Tosic ..................... G06V 10/82 |

OTHER PUBLICATIONS

Zikun Liu, et al., "Rotated Region Based CNN for Ship Detection," IEEE International Conference on Image Processing (ICIP), Sep. 2017, IEEE, http://ir.ia.ac.en/bitstream/173211/14548/1/rrcnn_final_v1.pdf.

* cited by examiner

METHOD AND SYSTEM FOR REGION PROPOSAL BASED OBJECT RECOGNITION FOR ESTIMATING PLANOGRAM COMPLIANCE

CROSS-REFERENCE TO RELATED APPLICATIONS AND PRIORITY

This U.S. patent application claims priority under 35 U.S.C. § 119 to India Application No. 201921028670, filed on Jul. 16, 2019. The entire contents of the abovementioned application are incorporated herein by reference.

TECHNICAL FIELD

The disclosure herein generally relates to a field of image processing. More particularly, a system and method for recognizing retail products from the images of the shelves of retail store to facilitate the measurement of the compliance level of retail store with respect to plan of display of products called planogram.

BACKGROUND

In a retail store, a customer effortlessly identifies the products displayed on shelves. However, the integration of such skills in a smart machine vision system poses various challenges. In the current arrangement, a product detection system is in use for continuous monitoring of the arrangement of products on the shelves, checking compliance of the planogram, estimating out-of-stock products, enhancing the value-added service to the consumer and assisting visually impaired shoppers.

The detection of products in a supermarket is an example where a single marketing image, also referred as template image, of a product is usually captured in a controlled studio-like environment. On the contrary, the images of the shelves are clicked in an uncontrolled retail store environment. Thus, the quality, illumination and resolution of the shelf image differs from those of the marketing image of the product. This poses an important challenge in detecting products. The recognition of hundreds of similar yet non-identical (fine-grained) products is yet another challenge.

Existing solutions for identifying potential regions in a product image but such solutions often identifies background regions as products as it does not consider the product templates for identifying potential regions. Further, for removing ambiguous detection, the existing solution considers only the confidence score. In some solutions the potential regions are identified by moving rectangular regions of different set of scales over the shelf, which is a time taking process and it does not considers the product templates. Furthermore, the existing solutions are incapable in identifying vertically stacked products.

SUMMARY

Embodiments of the present disclosure provides technological improvements as solutions to one or more of the abovementioned technical problems recognized by the inventors in conventional systems. For example, in one embodiment, a method and system to identify one or more products on a plurality of images of one or more shelves of a retail store to facilitate compliance level of the retail store with respect to the planograms.

In one aspect, a system is configured to identify one or more products on a plurality of images of one or more shelves of a retail store to facilitate compliance level of the retail store with respect to the planograms. The system comprises at least one memory storing a plurality of instructions and one or more hardware processors communicatively coupled with the at least one memory. The one or more hardware processors are configured to execute one or more modules. Further, the system comprises one or more multimedia components, which are configured to capture one or more images of the shelf. The one or more captured images comprising one or more products present in the shelf. An augmentation module of the system is configured to augment at least one instance of each of the one or more products present in the one or more images. A training module of the system is configured to train a Convolutional Neural Network (CNN) model with the augmented instance of each of the one or more products. Herein, one or more features of the augmented instance of each of the one or more products are extracted from the trained CNN model to train a random forest classifier. Further, the system comprises a processing module configured to process the one or more captured images of the shelf using a key-point based matching to identify a set of matching key-points between each of the product instance and the one or more products present in the one or more captured images of the shelf. A clustering module of the system is configured to cluster the set of identified matched key-points to establish one or more clusters on each of the one or more products present in the one or more captured images of the shelf.

Furthermore, an analyzing module of the system is configured to analyze a plurality of geometric transformations on the one or more captured images of the shelf to identify a set of scales at which each of the one or more products present in the one or more captured images of the shelf using the trained CNN and the trained random forest classifier. An identification module of the system is configured to identify a plurality of region proposals at the identified set of scales for each of the one or more clusters of each of the one or more products present in the one or more captured images of the shelf. A classification module of the system is configured to classify the identified plurality of region proposals using the trained CNN and the trained random forest classifier to produce a class label and a class confidence score of each of the identified plurality of region proposals. A recommendation module of the system is configured to recommend the one or more products present in the shelf based on the class label, the class confidence score of each of the plurality of region proposals and a graph-based non-maximum suppression (G-NMS) model. The G-NMS model is also used for removing one or more ambiguous detections.

In another aspect, a processor-implemented method to identify one or more products on a plurality of images of one or more shelves of a retail store to facilitate compliance level of the retail store with respect to planograms. The method comprises one or more steps as capturing one or more images of a shelf present in a predefined space of a retail store, wherein the one or more images of the shelf comprising one or more products present in the shelf. Augmenting at least one instance of each of the one or more products present in the one or more images of the shelf, training a Convolutional Neural Network (CNN) model with the augmented instance of each of the one or more products. Herein, one or more features of the augmented instance of each of the one or more products are extracted from the trained CNN model to train a random forest classifier. Further, the one or more captured images of the shelf are processed using a key-point based matching to identify a set of matching key-points between each of the product instance and the one or more products present in the one or more captured images of the shelf.

Furthermore, a set of matching key-points are identified between the product instance and the captured one or more images using a key-point based model, and clustering the set of identified matched key-points to establish one or more clusters on each of the one or more products present in the one or more captured images of the shelf. Analyzing a plurality of geometric transformations on the one or more captured images of the shelf to identify a set of scales at which each of the one or more products present in the one or more captured images of the shelf using the trained CNN and the trained random forest classifier. Further, identifying a plurality of region proposals at the identified set of scales for each of the one or more clusters of each of the one or more products present in the one or more captured images of the shelf and classifying the identified plurality of region proposals using the trained CNN and the trained random forest classifier to produce a class label and a class confidence score of each of the identified plurality of region proposals. Finally, at the last step one or more products are recommended based on the class label, the class confidence score of each of the plurality of region proposals, and a graph-based non-maximum suppression (G-NMS) model. The G-NMS model is also used for removing one or more ambiguous detections.

In yet another embodiment, a non-transitory computer readable medium storing one or more instructions which when executed by a processor on a system, cause the processor to perform a processor-implemented method. Wherein, the processor-implemented method to identify one or more products on a plurality of images of one or more shelves of a retail store to facilitate compliance level of the retail store with respect to planograms.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
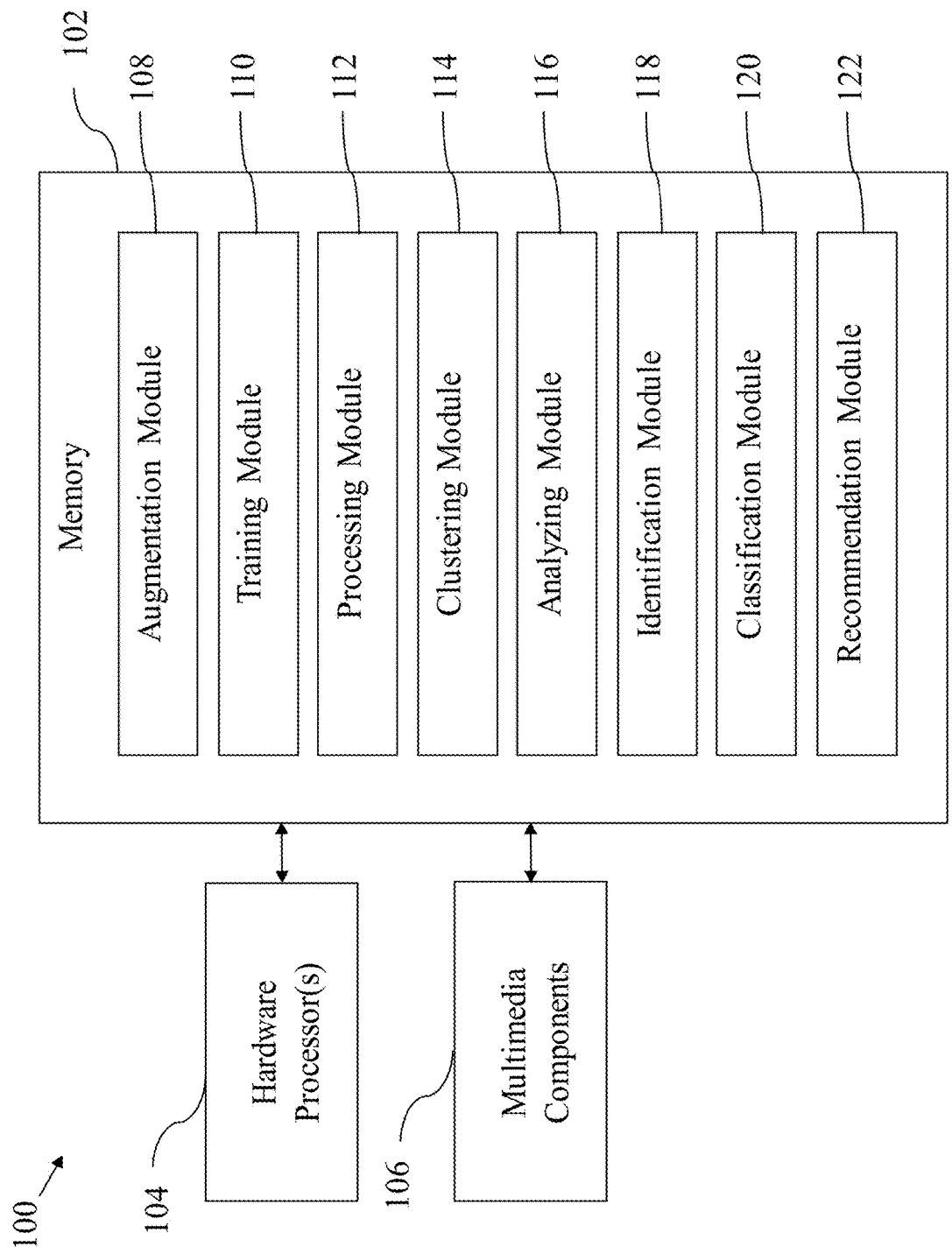
FIG. 1 illustrates a system to identify one or more products on a plurality of images of one or more shelves of a retail store to facilitate compliance level of the retail store with respect to planograms, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

The embodiments herein provide a system and method to identify one or more products on a plurality of images of one or more shelves of a retail store to facilitate compliance with respect to planograms. Planogram is a visual plan, which designates the placement of products on one or more shelves and merchandising display fixtures of the retail store. Planograms are used to create consistency between store locations, to provide proper shelf space allocation, to improve visual merchandising appeal, and to create product-pairing suggestions. It would be appreciated that there are a few assumptions considering at least one instance per product class is available beforehand and the physical dimension of each product template is available in some suitable unit of length. In case of absence of physical dimension of the products, a context information of the retail store will be used. The context information means products of similar shapes or classes are arranged together in the one or more shelves for consumers' convenience.

Referring now to the drawings, and more particularly to FIG. 1 through FIG. 6, where similar reference characters denote corresponding features consistency throughout the figures, preferred embodiments are shown and these embodiments are described in the context of the following exemplary system and/or method.

In one embodiment, wherein the system (100) is configured to identify one or more products on a plurality of images of one or more shelves of a retail store to facilitate compliance with respect to planograms. It is to be noted that the retail stores usually have thousands of products. The packaging of the products are frequently changed for promotional purpose. The promotional image of the product is usually made available before the product's arrival in the stores. This will ease the process of re-training of an existing deep learning model for detecting products.

It would be appreciated that the said disclosure takes care of both recognition and localization of one or more products displayed on the one or more shelves of the retail store. It should be noted that one or more assumptions are predefined and they should be taken into account while execution. The one or more assumptions include at least one instance per product class should be available beforehand. The physical dimension of each product template is available in some suitable unit of length. In case of absence of physical dimension of the one or more products, context information of the retail store will be used. The context information of the retail store provides information of one or more products of similar shapes or classes and usually they are arranged together in shelf for customer convenience. Further, the shelf images are nearly fronto-parallel.

Referring FIG. 1, wherein the system (100) comprises at least one memory (102) with a plurality of instructions and one or more hardware processors (104) which are communicatively coupled with the at least one memory (102) to execute modules therein. Further, the system (100) comprises one or more multimedia components (106), an augmentation module (108), a training module (110), a processing module (112), a clustering module (114), an analyzing module (116), an identification module (118), a classification module (120), and a recommendation module (122).

The hardware processor (104) may be implemented as one or more microprocessors, microcomputers, microcontrollers, digital signal processors, central processing units, state machines, logic circuitries, and/or any devices that manipulate signals based on operational instructions. Among other capabilities, the hardware processor (104) is configured to fetch and execute computer-readable instructions stored in the memory (102).

In the preferred embodiment of the disclosure, the one or more multimedia components (106) of the system (100) to capture one or more images of a shelf present in a predefined space of a retail store, wherein the one or more images of the shelf comprising one or more products present in the shelf.

In the preferred embodiment of the disclosure, the augmentation module (108) of the system (100) is configured to augment at least one instance of each of the one or more products present in the one or more captured images of the shelf. The augmentation module (108) comprises of one or more photometric transformations such as random contrast addition, random brightness adjustment, noise addition and blurring. Further, the augmentation module (108) includes one or more geometric transformations such as rotation, translation, shearing and distortion. The augmented instance of each of the one or more products comprises one or more features.

Figure 2:
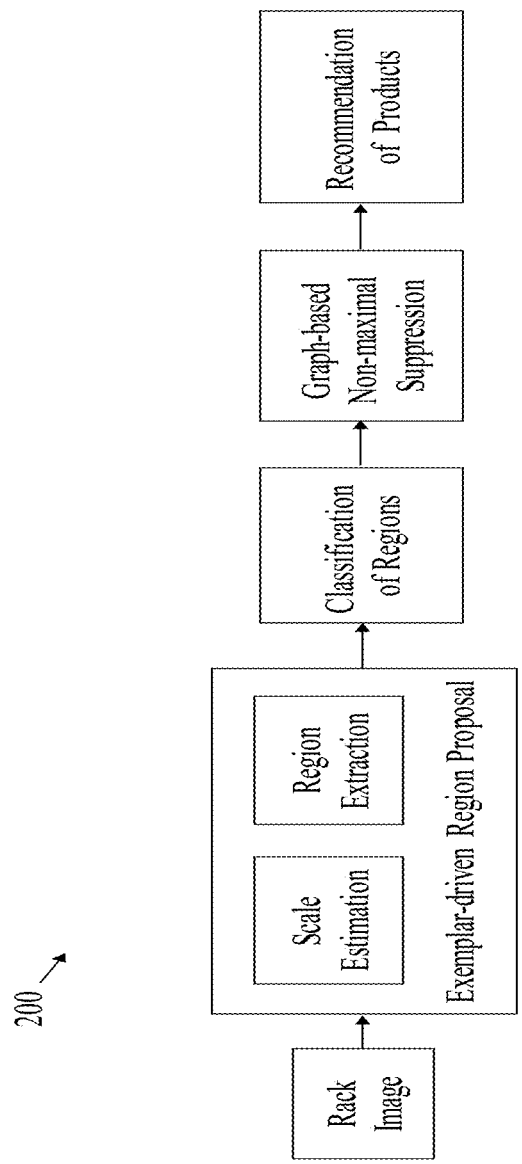
FIG. 2 is a functional block diagram of the system to identify one or more products on a plurality of images using exemplar-driven region proposal, in accordance with some embodiments of the present disclosure.

In the preferred embodiment of the disclosure, the training module (110) of the system (100) is configured to train a Convolutional Neural Network (CNN) model with the augmented instance of each of the one or more products. The one or more features of the augmented instance of each of the one or more products are extracted using the trained CNN model to train a random forest classifier. It is to be noted that the deep learning based convolutional neural network (CNN) is used to implement an exemplar-driven region proposal (ERP) scheme. Wherein, the ERP scheme is built to localize one or more products. It would be appreciated that the ERP scheme carries out the localization of one or more products while a classification arrangement takes care of the recognition/classification, as shown in FIG. 2.

Figure 3:
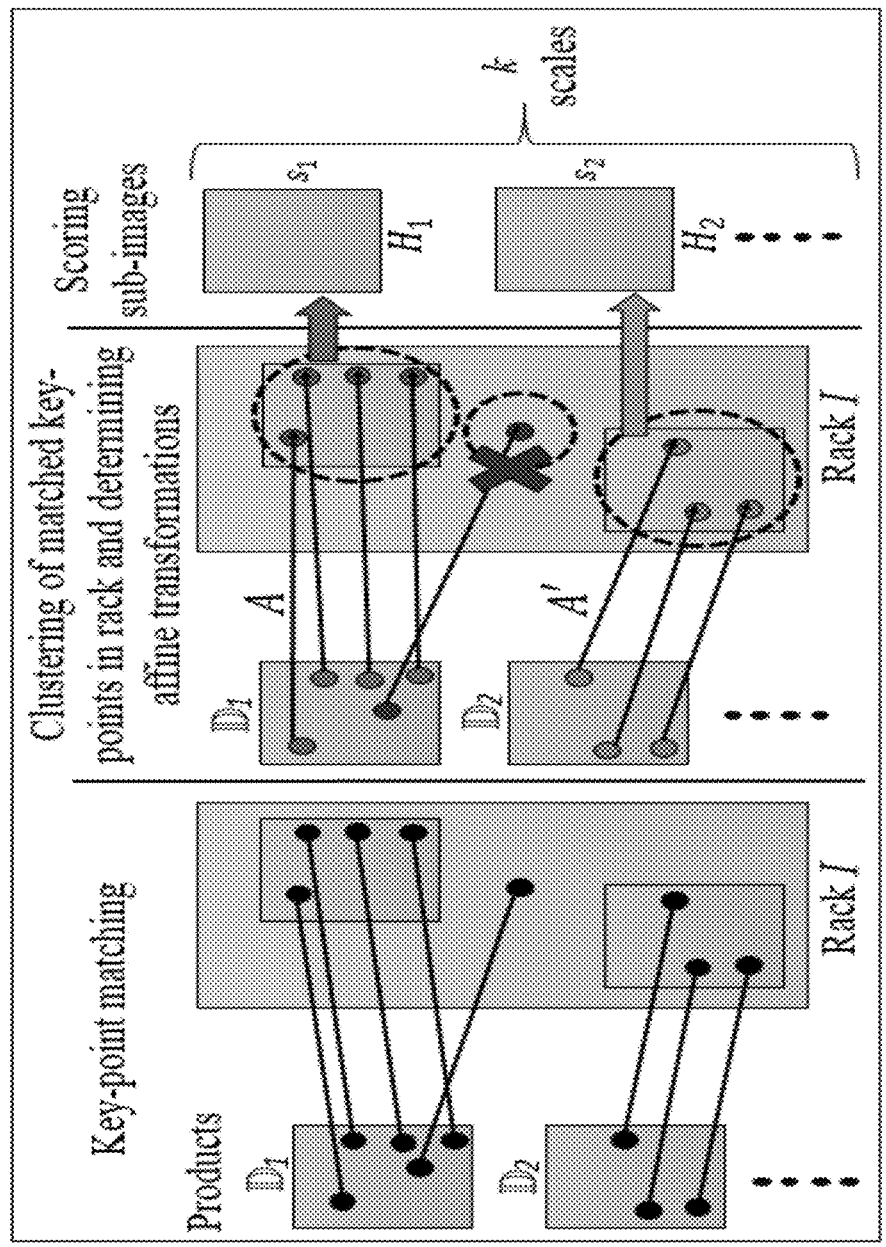
FIG. 3 is a schematic diagram for estimating set of scales between one or more products and the shelf, in accordance with some embodiments of the present disclosure.

Referring FIG. 3, as an example, wherein the ERP takes a rack image as an input consisting of one or more shelves and returns a plurality of region proposals. This region proposal scheme is in two stages, one is set of scales identification and a region extraction. However, the physical dimension of the shelf is unknown. To localize the products $D_t$ in the shelves, descriptor of each of the template of one or more images are extracted. Herein, the descriptor defines a point (referred as key-point) in the image and a 64-dimensional feature vector at that point.

It is to be noted that the set of scales between the one or more products and the shelf plays an important role in extracting the plurality of region proposals. The set of scales identification process starts by analyzing plurality of geometric transformations. Consequently, each of the plurality of geometric transformations is assigned a confidence score. Using top k-scored geometric transformations, the system identifies the k possible set of scales between the product and the shelf. The region extraction stage extracts potential regions from the one or more images of the shelf using these k-estimated set of scales. The set of matching key-points refer to the matching of the features vectors at those key-points. One or more features are extracted from each set of identified key-points on the product instance and the captured one or more images. Each of the one or more extracted features are compared to identify the features that are similar based on matchThreshold and ratioThreshold parameter.

In the preferred embodiment of the disclosure, the processing module (112) of the system (100) is configured to process the one or more captured images of the shelf using a key-point based matching to identify a set of matching key-points between each of the product instance and the one or more products present in the one or more captured images of the shelf.

In the preferred embodiment of the disclosure, the clustering module (114) of the system (100) is configured to cluster the set of identified matched key-points to establish one or more clusters on each of the one or more products present in the one or more captured images of the shelf. It is to be noted that the matching of key-points is not sufficient to determine correctly the location of the one or more products in the shelf, when the shelf displays multiple instances of the product.

In the preferred embodiment of the disclosure, the analyzing module (116) of the system (100) is configured to analyze a plurality of geometric transformations on the one or more captured images of the shelf to identify a set of scales at which each of the one or more products present in the one or more captured images of the shelf using the trained CNN and the trained random forest classifier.

In the preferred embodiment of the disclosure, the identification module (118) of the system (100) is configured to identify a plurality of region proposals at the identified set of scales for each of the one or more clusters of each of the one or more products present in the one or more captured images of the shelf. Further, the identified set of scales and the established one or more clusters are used to identify at least one potential region on the one or more images of the shelf.

In the preferred embodiment of the disclosure, the classification module (122) of the system (100) is configured to classify the identified plurality of region proposals using the trained CNN and the trained random forest classifier to produce a class label and a class confidence score of each of the identified plurality of region proposals.

In order to recognize the plurality of region proposals, the training samples are augmented from template images of the products. It would be appreciated that the system (100) is configured to re-train the CNN for extracting a fixed length 4096-dimensional feature vectors. Further, the system (100) trains the random forest (RF) classifier using the 4096-dimensional feature vectors of augmented training samples. Once the training is complete, a region proposal is classified by feeding the 4096-dimensional feature vector extracted from CNN into the RF classifier. The RF classifier provides the product class label and the class confidence score for the region. It would be appreciated that the region proposals with relatively lower confidence scores are discarded based on a scoreThresh parameter.

In the preferred embodiment of the disclosure, a recommendation module (124) of the system is configured to recommend the one or more products present in the shelf based on the class label, the class confidence score of each of the plurality of region proposals and a graph-based non-maximum suppression G-NMS model. Herein, the G-NMS model takes the plurality of region proposals, the class confidence scores and the class labels of each of the plurality of region proposals to provide a final output with identified one or more products. Further, the G-NMS model is also used to remove one or more ambiguous detections. The one or more ambiguous detections comprises of identification of multiple products at the same location, identification of background region as product and incorrect identification of a product.

In one aspect, the G-NMS model is a two-step process. First, G-NMS model calculates potential confidence scores of the plurality of region proposals. Next, the G-NMS model constructs a Directed Acyclic Graph (DAG) of the regions with the potential confidence scores and finds out the maximum weighted path of the DAG. The maximum weighted path defines the maximum sum of the potential confidence scores of the region proposals selected from each of the overlapping group of proposals. The maximum weighted path of the DAG provides the detected products in the rack. It is to be noted that the potential confidence score represents not only the class confidence score but also the relative importance of the proposal in an overlapping group. The proposal with higher potential confidence score in an overlapping group provide a better fit for the true product. The DAG includes the proposals and two dummy nodes source (S) and sink (T).

Further, the plurality of region proposals are first ordered by sorting their scores in descending order. The G-NMS model retains one detection per group of overlapping detection. It would be appreciated that the intersection over-union (IoU) between two regions of the plurality of region proposals defines the overlap amount (between those two regions) which then defines an overlapping group of the plurality of region proposal. Two regions are considered as overlap if the overlap amount (IoU) between them is greater than IoUthresh parameter. Scores of the plurality of region proposals (which better fit a true product) of same class in the overlapping group are consistent. In the overlapping group, the standard deviation of the scores of the plurality of region proposals (which better fit the true product) of same class is less and the mean overlap amount of the plurality of region proposals (which better fit the true product) of same class in a group is maximum. Thus, a proposal in an overlapping group with maximum mean IoU provides a better fit for the true product.

In another embodiment, while constructing the DAG, the system (100) first draw the outgoing edges from source S to all other vertices except T and assign the value of epsilon as the weights to all these edges. The edges are drawn from all the vertices except the source S (i.e. from all the proposals) to the sink T and the weights of the edges are the potential confidence scores of the corresponding proposals. Further, while constructing the DAG, the remaining vertices are selected sequentially based on the scores in descending order to make connections between them and the weight of any such connection is the potential confidence score. The connections between the pluralities of region proposals in DAG are established in such a way that the graph DAG does not contain any cycle and any path of DAG includes at most one detection per overlapping group.

It would be appreciated that the two vertices, which denote plurality of region proposals, are connected if DAG has an edge from a region with higher score to a region with lower score but do not have the edge from a region with lower score to a region with higher score. This criterion enforces the non-existence of the cycles in G.

In another aspect, wherein the DAG may have an outgoing edge from a region A to B only when the intersection of the overlapping groups of A and B does not include any of these two proposals. In this way, at most one detection per overlapping group is enforced in any path of DAG. The DAG may have an outgoing edge from a region A to B only when any predecessor of A does not belong to the overlapping group of B.

Figure 4:
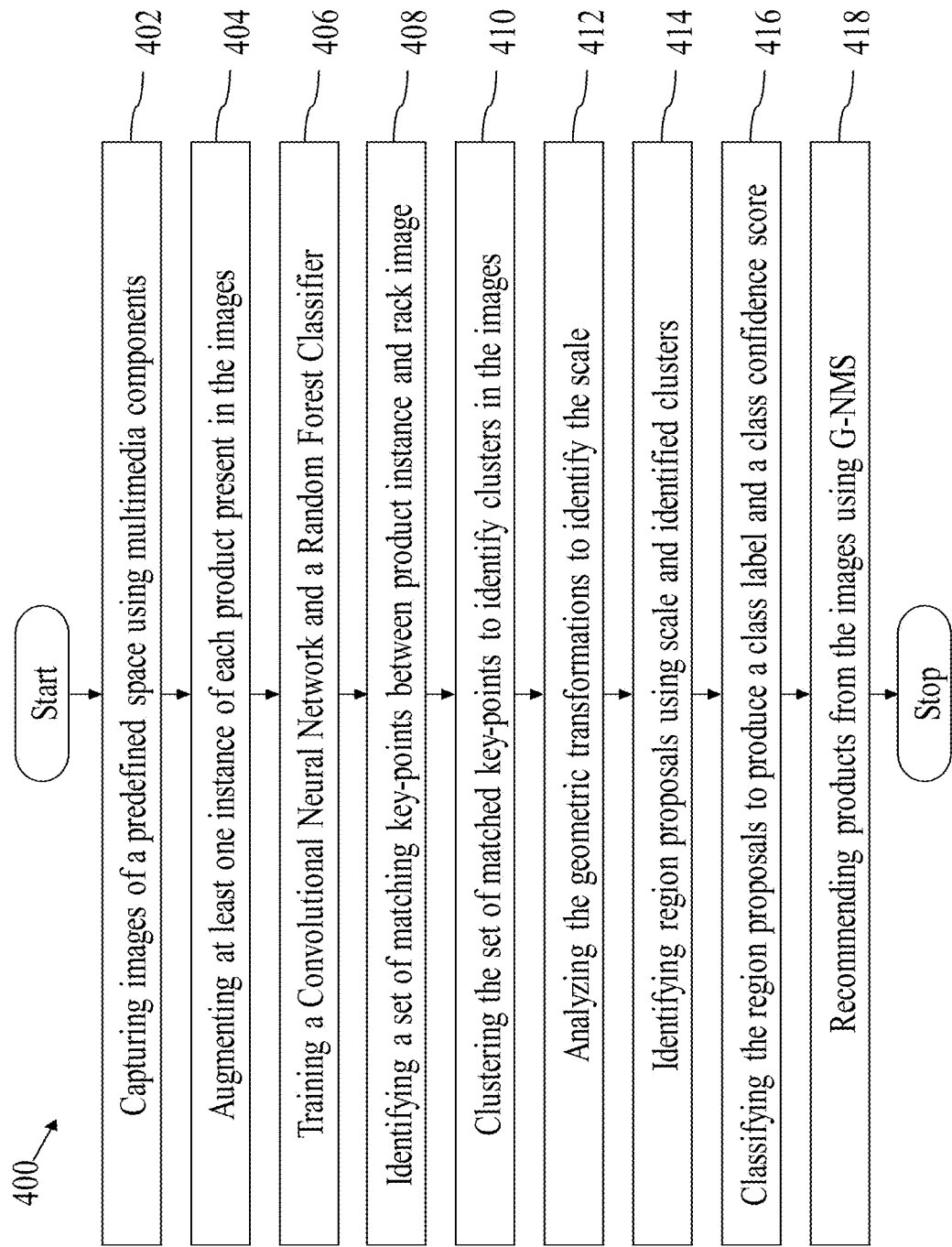
FIG. 4 is a flow diagram to illustrate a method to identify one or more products on a plurality of images of one or more shelves of a retail store to facilitate compliance with respect to planograms, in accordance with some embodiments of the present disclosure.

Referring FIG. 4, a processor-implemented method (400) to identify one or more products on a plurality of images of one or more shelves of a retail store to facilitate compliance with respect to planograms. The method comprises one or more steps as follows.

Initially, at the step (402), one or more images of a shelf present in a predefined space of a retail store are captured via one or more multimedia components (106) of the system (100). It is to be noted that the captured one or more images comprising one or more products present in the shelf.

In the preferred embodiment of the disclosure, at the next step (404), augmenting at an augmentation module (108) of the system (100) at least one instance of each of the one or more products present in the one or more images of the shelf.

In the preferred embodiment of the disclosure, at the next step (406), a Convolutional Neural Network (CNN) model is trained with the augmented instance of each of the one or more products. Further, one or more features of the augmented instance of each of the one or more products are extracted from the trained CNN model to train a random forest classifier.

In the preferred embodiment of the disclosure, at the next step (408), processing the one or more captured images of the shelf using a key-point based matching to identify a set of matching key-points between each of the product instance and the one or more products present in the one or more captured images of the shelf.

In the preferred embodiment of the disclosure, at the next step (410), clustering the set of identified matched key-points to establish one or more clusters on each of the one or more products present in the one or more captured images of the shelf.

In the preferred embodiment of the disclosure, at the next step (412), analyzing the plurality of geometric transformations on the one or more captured images of the shelf to identify a set of set of scales at which each of the one or more products present in the one or more captured images of the shelf using the trained CNN and the trained random forest classifier.

In the preferred embodiment of the disclosure, at the next step (414), identifying a plurality of region proposals at the identified set of set of scales for each of the one or more clusters of each of the one or more products present in the one or more captured images of the shelf.

In one example, let n be the number of individual products in a database of product templates D. In other words, n is the number of product classes. To refer each product template as $D_t$, t=1, 2 . . . n. It is assumed that the physical dimensions of each product template is provided in some unit of length. For the set of scales estimation, BRISK key-points and feature vectors of all the template images of products and rack image are identified. The identified BRISK key-points of the product are matched with those of the shelf I (the matching of the key-points refers to the matching of the feature vectors at those key-points) by calculating the hamming distance for measuring dissimilarity between any two BRISK feature vectors.

The matching of BRISK key-points is performed to find out the probable locations of product in the shelf. However, the matching of key-points is not sufficient for correctly determining the location of the product in the shelf, when the shelf contains multiple instances of the product. Therefore, the matched key-points in the shelf are clustered based on minimumPoints and maximumRadius parameter to locate the multiple instance of the product. Further, affine transformation matrix are determined for each of the clusters, which helps in extracting sub-images of the products from the shelf. Each sub-images are classified at the classification module (122) of the system (100) using the trained CNN and the trained random forest classifier to produce a class label and a class confidence score. Top k number of sub-images sorted based on descending class confidence scores are selected to define k different set of scaless using the physical dimensions of products.

Figure 5:
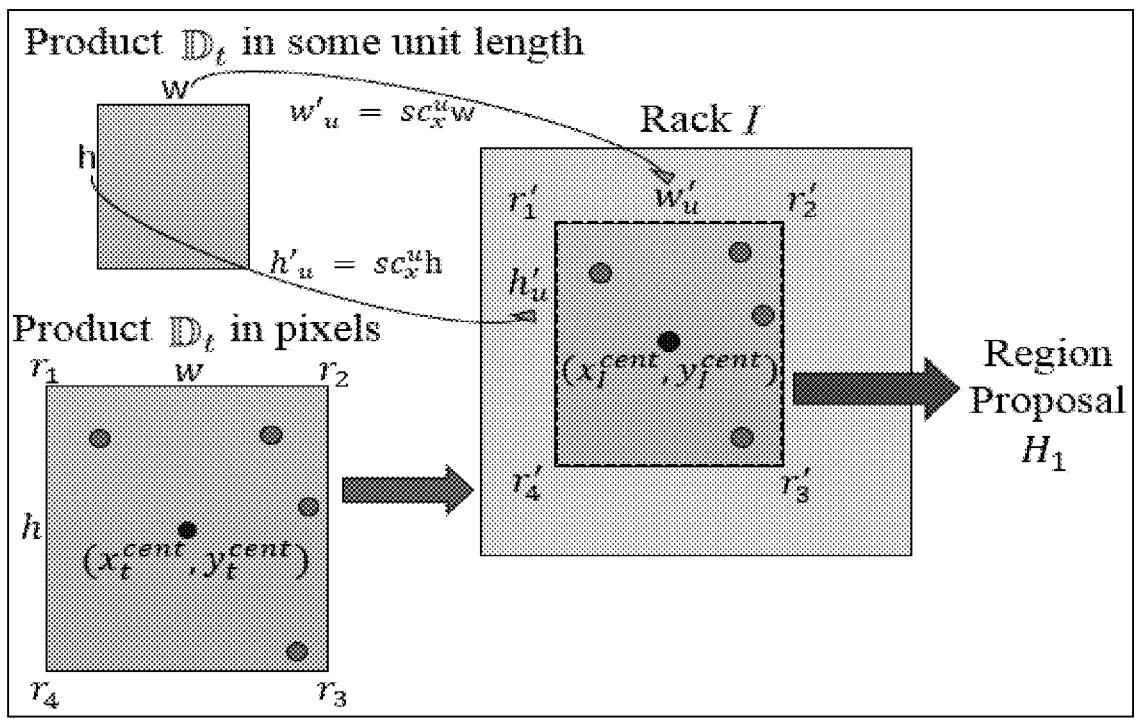
FIG. 5 is a schematic diagram for set of scales estimation procedure, in accordance with some embodiments of the present disclosure.

Referring FIG. 5, as an example, wherein a cluster of matched key-points $(x_I^m, y_I^m)$ in a rack I is obtained for the $t^{th}$ product $D_t$. Let $(x_I^n, y_I^n)$ and $(x_t^n, y_t^n)$, n=1, 2, 3, 4 be the key-points in the cluster of the rack I and corresponding matched key-points in $t^{th}$ product $D_t$. The system now extracts potential regions from I using the geometric alignment of the matched key-points and k estimated set of scaless. The system first calculates the centroids $(x_I^{cent}, y_I^{cent})$ and $(x_t^{cent}, y_t^{cent})$ of the matched key-points $(x_I^n, y_I^n)$ in the cluster of I and $(x_t^n, y_t^n)$ in the $t^{th}$ product. Let the top k x-set of scaless and y-set of scaless be $sc_x^u$ and $sc_y^u$, u=1, 2, ... k. Let h and w be the height and width in pixels of the $D_t$ while h and w be the height and width in some unit length of $D_t$. For $u^{th}$ set of scales $sc_x^u$ and $sc_y^u$, the transformed width and height of $D_t$ in I are $w_u' = (sc_x^u * w)$ pixels and $h_u' = (sc_y^u * h)$ pixels respectively. Further, let $r_1, r_2, r_3$ and $r_4$ be the four corner points of the $t^{th}$ product $D_t$. So, $r_1=(0,0)$, $r_2=(w,0)$, $r_3=(w,h)$ and $r_4=(0,h)$. The centroid $(x_t^{cent}, y_t^{cent})$ lies within these four corner points. Let the four corner points be transformed to $r_1', r_2', r_3'$ and $r_4'$ in the rack I for a cluster. For $u^{th}$ set of scales, the co-ordinates of the transformed points in I are determined with the below equations. Let $H_1$ be the rectangular region of I covered by the four points $r_1', r_2', r_3'$ and $r_4'$. Therefore, $H_1$ is a potential region proposal. The process is repeated for all set of scaless and clusters for each product template $D_t$, t=1, 2, ..., n.

$$r_1' = \left(x_I^{cent} - \frac{w_u'}{w}x_t^{cent},\ y_I^{cent} - \frac{h_u'}{h}y_t^{cent}\right)$$

$$r_2' = \left(x_I^{cent} - \frac{w_u'}{w}x_t^{cent} + w_u',\ y_I^{cent} - \frac{h_u'}{h}y_t^{cent}\right)$$

$$r_3' = \left(x_I^{cent} - \frac{w_u'}{w}x_t^{cent} + w_u',\ y_I^{cent} - \frac{h_u'}{h}y_t^{cent} + h_u'\right)$$

$$r_4' = \left(x_I^{cent} - \frac{w_u'}{w}x_t^{cent},\ y_I^{cent} - \frac{h_u'}{h}y_t^{cent} + h_u'\right)$$

In the preferred embodiment of the disclosure, at the next step (416), the identified plurality of region proposals are classified at the classification module (120) of the system (100) using the trained CNN and the trained random forest classifier to produce a class label and a class confidence score for each of the plurality of region proposals.

Figure 6:
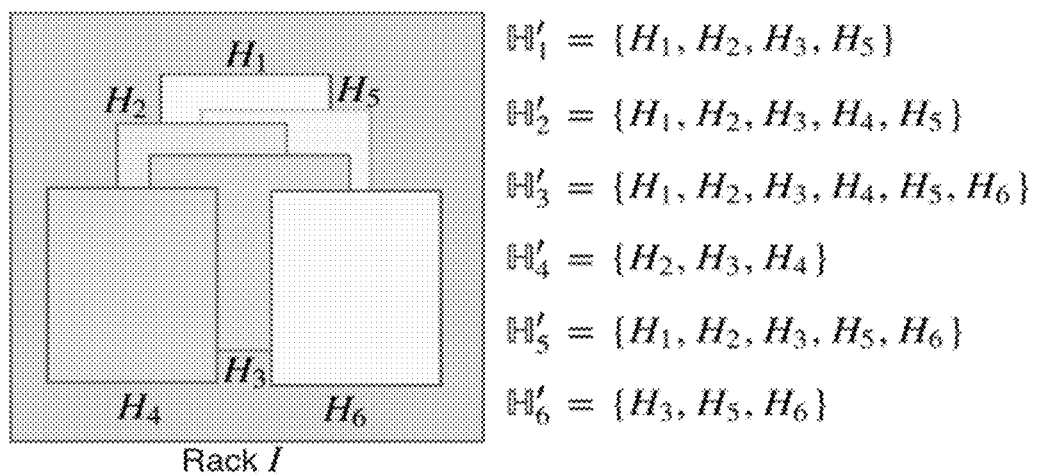
FIG. 6 is a schematic diagram to show overlapping regions of proposals, in accordance with some embodiments of the present disclosure.

Referring FIG. 6, in another example, wherein six region proposals are identified for a rack image I. The region proposals are first ordered by sorting their scores in descending order. Let $H_1, H_2, \ldots, H_6$ be the ordered region proposals with the scores $s_1, s_2, \ldots, s_6$ respectively. For each $H_z$, z=1, 2, ..., 6, the system first find the overlapped regions of $H_z$. Two regions are considered as overlap if the overlap amount between them is greater than a threshold i.e. IoUthresh. As shown in FIG. 6, let $H_1, H_2, H_3, H_5$ be the overlapped regions of $H_1$ with the overlap amounts $o_1, o_2, o_3, o_5$ respectively. It is to be noted that $H_1' = \{H_1, H_2, H_3, H_5\}$ is defined as the overlapping group of $H_1$. Let $H_1$ be recognized as class label $D_1$. Further, the system finds the proposals in $H_1'$ which are also recognized as $D_1$. Let $H_2, H_5$ be also classified as label $D_1$. Out of the four regions in the overlapping group $H_1'$, three regions $H_1, H_2, H_5$ are classified as same class/product. As stated earlier, the standard deviation of the scores $s_1, s_2, s_5$ of the similar labelled regions $H_1, H_2, H_5$ in $H_1'$ is less and mean of the overlap amounts $o_1, o_2, o_5$ of the same is maximum. These properties of the proposals are taken into account by defining the potential confidence score for $H_1$ (say $ps_{H1}$) as $$s_1 - \frac{\text{std\_dev}(\{s_1, s_2, s_5\})}{3} + \text{mean}(\{o_1, o_2, o_5\}).$$

In calculating the potential confidence score $ps_{H1}$, the larger value of $$\frac{\text{std\_dev}(\{s_1, s_2, s_5\})}{3}$$

penalizes the confidence score of $H_1$. As the larger value of $$\frac{\text{std\_dev}(\{s_1, s_2, s_5\})}{3}$$

indicates that $H_1$ may not be the right choice for the correct product. Similarly the score of $H_1$ is also penalized for the smaller value of $\text{mean}(\{o_1, o_2, o_5\})$. Thus, the potential confidence score of $H_1$ represents not only the class confidence score but also the relative importance of the proposal in an overlapping group.

In the preferred embodiment of the disclosure, at the last step (418), one or more products from the one more images are recommended based on the class confidence score of each of the plurality of region proposals, wherein a graph-based non-maximum suppression (G-NMS) model is used for removing one or more ambiguous detections. It is to be noted that the G-NMS takes the plurality of region proposals, class confidence scores and class labels of each of the plurality of region proposals to provide a final output with identified one or more products.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem associated with detection of products in a supermarket. In an example where a single marketing image, also referred as template image of a product is usually captured in a controlled studio-like environment. On the contrary, the shelf images are clicked in an uncontrolled retail store environment. Thus, the quality, illumination, and resolution of the shelf image differ from those of the marketing image of the product. This poses an important challenge in detecting products. The recognition of hundreds of similar yet non-identical or fine-grained products is yet another challenge.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purpose of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development would change the manner in which particular functions are performed. These examples are presented herein for purpose of illustration, and not limitation. Further, the boundaries of the functional building blocks have been arbitrarily defined herein for the convenience of the description. Alternative boundaries can be defined as long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A system comprising:
at least one memory storing a plurality of instructions;
one or more hardware processors communicatively coupled with the at least one memory, wherein the one or more hardware processors are configured to execute one or more modules;
one or more multimedia components configured to capture one or more images of a shelf present in a predefined space of a retail store, wherein the one or more images of the shelf comprising one or more products present in the shelf;
an augmentation module configured to augment at least one instance of each of the one or more products present in the one or more captured images of the shelf, wherein the augmented instance comprising one or more features;
a training module configured to train a Convolutional Neural Network (CNN) model with the augmented instance of each of the one or more products, wherein the one or more features of the augmented instance of each of the one or more products are extracted from the trained CNN model to train a random forest classifier;
a processing module configured to process the one or more captured images of the shelf using a key-point based matching to identify a set of matching key-points between each of the product instances and the one or more products present in the one or more captured images of the shelf;
a clustering module configured to cluster the set of identified matched key-points to establish one or more clusters on each of the one or more products present in the one or more captured images of the shelf;
an analyzing module configured to analyze a plurality of geometric transformations on the one or more captured images of the shelf to identify a set of scales using the trained CNN and the trained random forest classifier;
an identification module configured to identify a plurality of region proposals at the identified set of scales for each of the one or more established clusters of each of the one or more products present in the one or more captured images of the shelf;
a classification module configured to classify the identified plurality of region proposals using the trained CNN and the trained random forest classifier to produce a class label and a class confidence score of each of the identified plurality of region proposals; and a recommendation module configured to recommend the one or more products present in the shelf based on the class label, and the class confidence score of each of the plurality of region proposals using a graph-based non-maximum suppression (G-NMS) model.

2. The system claimed in claim 1, wherein the G-NMS model constructs a Directed Acyclic Graph (DAG) of the plurality of region proposals.

3. The system claimed in claim 1, further comprises an intersection over union (IOU) between two adjacent regions of the plurality of region proposals, which is defined as an overlapping group of plurality of region proposals.

4. The system claimed in claim 1, wherein the G-NMS model retains one detection per overlapping group of plurality of region proposals for overlapping detection.

5. The system claimed in claim 1, wherein the G-NMS model takes the plurality of region proposals, the class confidence scores and the class labels of each of the plurality of region proposals and finds out the maximum weighted path of the DAG for removing one or more ambiguous detections.

6. The system claimed in claim 1, wherein a key-point based matching and clustering is used to estimate the plurality of geometric transformations on each of the one or more products present in the one or more captured images of the shelf.

7. The system claimed in claim 1, wherein the plurality of geometric transformations comprising a plurality of physical dimensions related to each of the one or more products.

8. A processor-implemented method comprising one or more steps as:

capturing, via one or more hardware processors, one or more images of a shelf present in a predefined space of a retail store, wherein the one or more images of the shelf comprising one or more products present in the shelf;

augmenting, via one or more hardware processors, at least one instance of each of the one or more products present in the one or more images of the shelf using the augmentation module, wherein the augmented instance comprising one or more features;

training, via one or more hardware processors, a Convolutional Neural Network (CNN) model with the augmented instance of each of the one or more products, wherein the one or more features of the augmented instance of each of the one or more products are extracted from the trained CNN model to train a random forest classifier;

processing, via one or more hardware processors, the one or more captured images of the shelf using a key-point based matching to identify a set of matching key-points between each of the product instances and the one or more products present in the one or more captured images of the shelf;

clustering, via one or more hardware processors, cluster the set of identified matched key-points to establish one or more clusters on each of the one or more products present in the one or more captured images of the shelf;

analyzing, via one or more hardware processors, a plurality of geometric transformations on the one or more captured images of the shelf to identify a set of scales using the trained CNN and the trained random forest classifier;

identifying, via one or more hardware processors, a plurality of region proposals at the identified set of scales for each of the one or more clusters of each of the one or more products present in the one or more captured images of the shelf;

classifying, via one or more hardware processors, identified plurality of region proposals using the trained CNN and the trained random forest classifier to produce a class label and a class confidence score of each of the identified plurality of region proposals; and recommending, via one or more hardware processors, the one or more products based on the class label, and the class confidence score of each of the plurality of region proposals using a graph-based non-maximum suppression (G-NMS) model.

9. The processor-implemented method claimed in claim 8, wherein the G-NMS model constructs a Directed Acyclic Graph (DAG) of the plurality of region proposals.

10. The processor-implemented method claimed in claim 8, further comprises an intersection over union (IOU) between two adjacent regions of the plurality of region proposals, which is defined as an overlapping group of plurality of region proposals.

11. The processor-implemented method claimed in claim 8, wherein the G-NMS model retains one detection per overlapping group of plurality of region proposals for overlapping detection.

12. The processor-implemented method claimed in claim 8, wherein the G-NMS model takes the plurality of region proposals, the class confidence scores and the class labels of each of the plurality of region proposals and finds out the maximum weighted path of the DAG for removing one or more ambiguous detections.

13. The processor-implemented method claimed in claim 8, wherein a key-point based matching and clustering is used to estimate the plurality of geometric transformations on each of the one or more products present in the one or more captured images of the shelf.

14. The processor-implemented method claimed in claim 8, wherein the plurality of geometric transformations comprising a plurality of physical dimensions related to each of the one or more products.

15. A non-transitory computer readable medium storing one or more instructions which when executed by a processor on a system, cause the processor to perform method comprising:

augmenting, via one or more hardware processors, at least one instance of each of the one or more products present in the one or more images of the shelf using the augmentation module, wherein the augmented instance comprising one or more features;

training, via one or more hardware processors, a Convolutional Neural Network (CNN) model with the augmented instance of each of the one or more products, wherein the one or more features of the augmented instance of each of the one or more products are extracted from the trained CNN model to train a random forest classifier;

processing, via one or more hardware processors, the one or more captured images of the shelf using a key-point based matching to identify a set of matching key-points between each of the product instances and the one or more products present in the one or more captured images of the shelf;

clustering, via one or more hardware processors, cluster the set of identified matched key-points to establish one or more clusters on each of the one or more products present in the one or more captured images of the shelf;

analyzing, via one or more hardware processors, a plurality of geometric transformations on the one or more captured images of the shelf to identify a set of scales using the trained CNN and the trained random forest classifier;

identifying, via one or more hardware processors, a plurality of region proposals at the identified set of scales for each of the one or more clusters of each of the one or more products present in the one or more captured images of the shelf;

classifying, via one or more hardware processors, identified plurality of region proposals using the trained CNN and the trained random forest classifier to produce a class label and a class confidence score of each of the identified plurality of region proposals; and recommending, via one or more hardware processors, the one or more products based on the class label, and the class confidence score of each of the plurality of region proposals using a graph-based non-maximum suppression (G-NMS) model.

* * * * *